US007607321B2

(12) United States Patent
Lai et al.

(10) Patent No.: US 7,607,321 B2
(45) Date of Patent: Oct. 27, 2009

(54) APPARATUS AND METHOD FOR SINGLE-SIDED LOADING OF A FURNACE OR OTHER PROCESS STATION

(75) Inventors: Jon W. Lai, Santa Barbara, CA (US); Thomas W. Tombler, Jr., Santa Barbara, CA (US); Brian Y. Lim, Santa Barbara, CA (US)

(73) Assignee: Atomate Corporation, Simi Valley, CA (US)

(*) Notice: Subject to any disclaimer, the term of this patent is extended or adjusted under 35 U.S.C. 154(b) by 593 days.

(21) Appl. No.: 10/773,755

(22) Filed: Feb. 6, 2004

(65) Prior Publication Data

US 2005/0175953 A1 Aug. 11, 2005

(51) Int. Cl.
*C03B 23/00* (2006.01)

(52) U.S. Cl. .......................................................... 65/36

(58) Field of Classification Search ...................... 65/36
See application file for complete search history.

(56) References Cited

U.S. PATENT DOCUMENTS 3,373,598 A * 3/1968 Johnson et al. ............... 374/14
4,763,536 A * 8/1988 Beshoory .................. 73/865.6

* cited by examiner

*Primary Examiner*—Steven P Griffin
*Assistant Examiner*—Russell J Kemmerle, III
(74) *Attorney, Agent, or Firm*—Aka Chan LLP

(57) ABSTRACT

Solutions permit or facilitate faster and/or easier processing involving loading or unloading of a work module into a process station. For example, the work module may be a processing tube or the like and the process station may be a heating station such as a tube furnace or the like. In one embodiment, the loading is from a single side of a process station. In one embodiment, the work module includes inlets and outlets for fluid flow, with both inlets and outlets being closer toward one side of the work module than the other side.

14 Claims, 7 Drawing Sheets

APPARATUS AND METHOD FOR SINGLE-SIDED LOADING OF A FURNACE OR OTHER PROCESS STATION

FIELD OF THE INVENTION

The present invention relates to apparatuses and methods involving facilitating processing of substances or products at a process station. Some embodiments of the present invention are especially suited for configuration as, or use with, laboratory furnaces or the like as the process station.

BACKGROUND

A tube furnace is one example of a process station. A tube furnace is to be loaded with, for example, a quartz tube so that the tube furnace can heat the quartz tube in order to facilitate processing of substances within the quartz tube. For example, chemical vapor deposition (CVD), laser vaporization, and other methods used in the fabrication of materials, nanostructures, and/or electronic devices frequently use a quartz tube and a heat source, where the quartz tube needs to be connected to inlet and outlet gas lines.

FIG. 1A is a schematic perspective view showing a typical conventional tube furnace 10. The conventional tube furnace 10, when configured for use, includes a body that is to surround a cylindrical portion of a quartz tube. (In FIG. 1A, the quartz tube is not shown.)

The body of the conventional tube furnace 10 includes an upper body portion 12 and a lower body portion 14 that respectively define an upper channel 16 and a lower channel 18. When the body portions 12 and 14 are positioned together, they together define a combined channel which includes the upper channel 16 and the lower channel 18. The combined channel is to enclose a cylindrical portion of the quartz tube. The channels 16 and 18 may each have a semi-circular profile such that they combine to form a cylindrical combined channel. The upper body portion 12 is connected to the lower body portion 14 by a rear hinge 20, such that the upper body portion 12 forms a hinged cover 12 that may be opened and closed. The conventional tube furnace 10 is typically set up for use by opening its hinged cover 12, loading a quartz tube into the lower channel 18, and closing the hinged cover 12.

FIG. 1B is a schematic front view of a typical conventional layout of a typical conventional quartz tube 30 in operation with a typical conventional tube furnace (such as the conventional tube furnace 10 shown in FIG. 1A). As is shown, there are furnace heating elements, such as a top furnace heating element 32 and a bottom furnace heating element 34 that heat the conventional quartz tube 30 that has two tube ends. Feedstock gas flows into the quartz tube 30 from a first end 36, as shown by the arrow 38, and flows out of the quartz tube 38 from a second, opposite end 40, as shown by the arrow 42. Thus, the conventional quartz tube 30 is typically connected to gas lines (not shown) respectively at each of the first end 36 and its substantially opposite second end 40. The top and bottom heating elements 32 and 34 respectively may be elements within the top and bottom body portions 12 and 14 of the tube furnace 10 shown in FIG. 1A. The gas lines may be high-temperature gas lines, such as may be used in CVD and other types of processing. The gas lines may include flexible lines.

Typically, heat must be provided by the tube furnace 10 (of FIG. 1A) for a substantial period of time after the hinged cover 12 is closed over the quartz tube in order to raise the temperature of the quartz tube and the tube furnace 10. In some situations, the substantial period of time is required due to a fact that when the hinged cover 12 is opened, substantial amounts of already-generated heat, if any, within the tube furnace 10 escapes and must be replaced.

SUMMARY OF THE INVENTION

What is needed are improved solutions involving a process station or a work module or associated apparatuses and methods.

According to an embodiment of the present invention, there is a solution that can permit or facilitate faster and/or easier processing involving loading or unloading of a work module into a process station. For example, the work module may be a processing tube or the like and the process station may be a heating station such as a tube furnace or the like.

According to an embodiment of the present invention, there is an apparatus for facilitating movement of a work piece, relative to a position for the work piece to be affected by a process station. The apparatus comprises: a mount for a work module, the mount capable of coupling to the work module, wherein the work module is configured to accommodate fluid flow while the work piece is being affected by the process station; a guide coupled to the mount, the guide configured to guide motion of the mount relative to the process station, the process station having a first side and an opposite second side, and the mount to move toward the process station externally from the first side, and the mount to move away from the process station externally from the first side.

According to an embodiment of the present invention, there is an apparatus for containing a work piece. The apparatus comprises: a housing, the housing to contain the work piece and to expose the work piece to fluid flow, an end of the housing hereinafter referred to as first end, and an end of the housing opposite the first end hereinafter referred to as second end; and a fluid inlet and a fluid outlet, the fluid inlet and outlet externally intersecting the housing closer to the first end than to the second end; wherein the housing is configured to be capable of externally receiving energy at least at a portion of the housing that is between the first and second ends, the portion of the housing being closer to the second end than are the fluid inlet and outlet.

According to an embodiment of the present invention, there is a method for producing an apparatus for containing a work piece and for directing fluid flow over the work piece during processing. The method comprises: providing a housing that defines an interior chamber, an end and an opposite end of the housing hereinafter being referred to as first and second ends of the housing, respectively, the housing having a first opening nearer the first end than the second end; and providing a conduit connected to the housing, the conduit including a second opening that opens into the interior chamber and a third opening that opens not into the interior chamber, the third opening being nearer to the first end than to the second end; wherein the fluid flow is from one of the first opening and the second opening to another of the first opening and the second opening, and one of the third and first openings is to accept input fluid and another of the third and first openings is to produce fluid output.

According to an embodiment of the present invention, there is a method for facilitating movement of an elongated housing containing a work piece into position to be affected by a process station. The method comprises: coupling a fluid inlet of the housing to a first fluid line; coupling a fluid outlet of the housing to a second fluid line; and inserting the housing into the process station substantially along an axis of elongation of the elongated housing.

BRIEF DESCRIPTION OF THE DRAWINGS

In order to more extensively describe some embodiment(s) of the present invention, reference is made to the accompanying drawings. These drawings are not to be considered limitations in the scope of the invention, but are merely illustrative.

DETAILED DESCRIPTION OF SPECIFIC EMBODIMENTS

The description above and below and the drawings of the present document refer to examples of embodiment(s) of the present invention and also describe some exemplary optional feature(s) and/or alternative embodiment(s). It will be understood that the embodiments referred to are for the purpose of illustration and are not intended to limit the invention specifically to those embodiments. For example, although embodiments of the present invention are discussed using examples involving a quartz tube with a tube furnace, the invention is not to be limited to those embodiments or to tube furnaces or to quartz tubes. Rather, the invention is intended to cover all that is included within the spirit and scope of the invention, including alternatives, variations, modifications, equivalents, and the like.

Figure 1A:
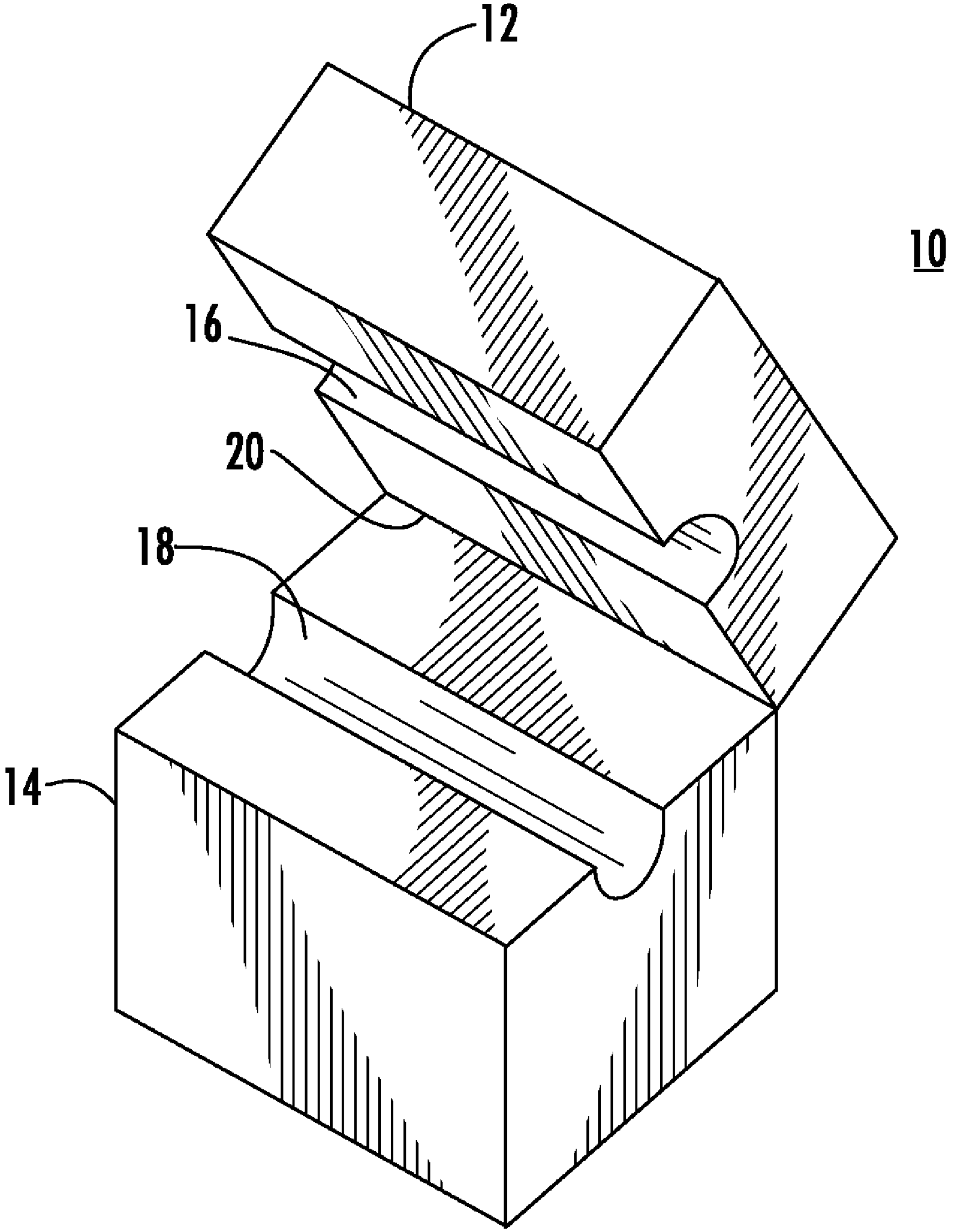
FIG. 1A (PRIOR ART)
FIG. 1A is a schematic perspective view showing a typical conventional tube furnace.
Figure 1B:
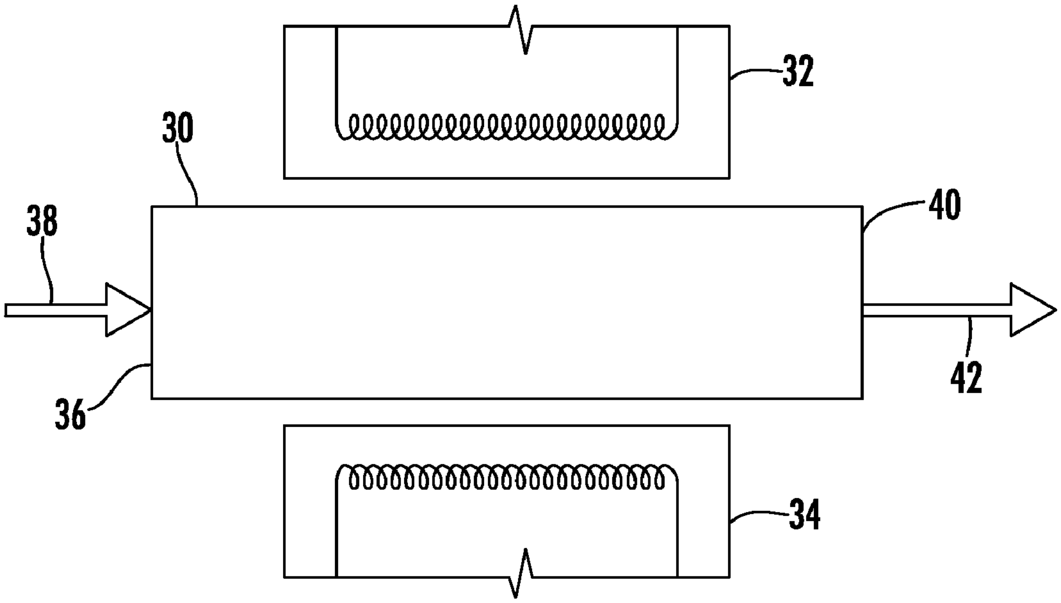
FIG. 1B (PRIOR ART)
FIG. 1B is a schematic front view of a typical conventional layout of a typical conventional quartz tube in operation with a typical conventional tube furnace.
Figure 2:
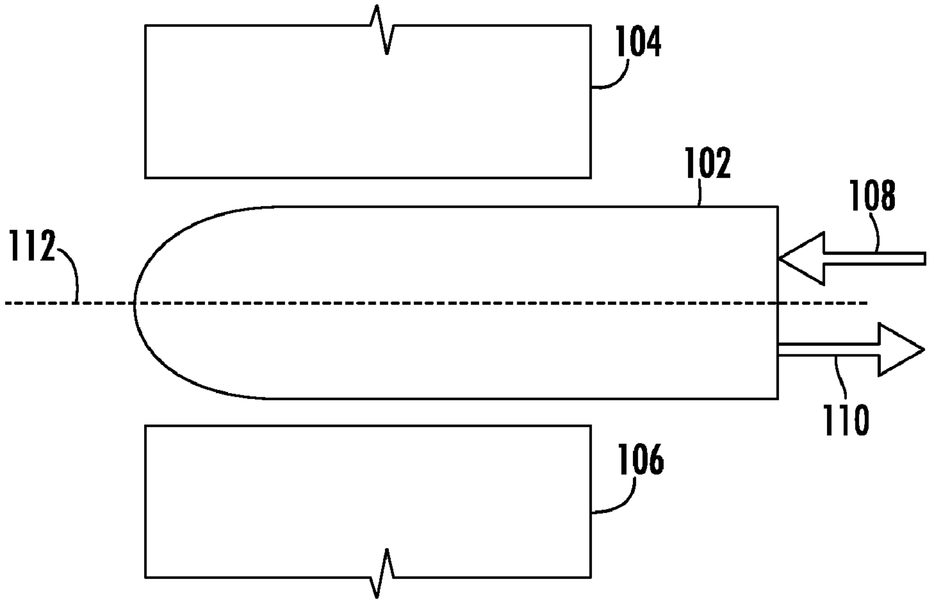
FIG. 2 is a schematic view showing a layout, according to an embodiment of the present invention, for a housing that is to be affected by a process station.

FIG. 2 is a schematic view showing a layout, according to an embodiment of the present invention, for a housing 102 that is to be affected by a process station. In FIG. 2, a portion of the process station is indicated schematically by process-station elements 104 and 106. The housing 102 is an example of a work module that is to be positioned toward a process station for the process station to act upon at least a portion of the work module.

In one example embodiment of FIG. 2, the housing 102 may be a quartz tube or the like, at least a portion of which is to be heated by a process station that may be a tube furnace or the like to facilitate processing of substances within the housing 102. In this example embodiment, the elements 104 and 106 may be heating elements that belong to the process station. In other embodiments, other types of process stations may instead be used, for example, irradiation stations, and the like. The process station may be a furnace, e.g., a tube furnace, e.g., a bench-top laboratory tube furnace. The process station may be an enclosed tube furnace having opaque walls. The process station may be a tube furnace of limited size, for example, one that is configured for tubes no greater than 16 inches in diameter, or no greater than 8 inches in diameter, or no greater than 4 inches in diameter. Similarly, the housing 102 may be limited in size to corresponding limits.

In an example embodiment, the housing 102 is to be affected by the process station while content of the housing 102 is to include fluid flow—for example, liquid or gas flow. The housing 102 has a feedstock fluid inlet and an exhaust fluid outlet, as is schematically indicated schematically by arrows 108 and 110, respectively. The inlet and outlet provide fluid flow within the housing 102 during use. The housing 102 includes a first end and an opposite second end. For example, the end of the housing 102 that is on the right side in FIG. 2 may be considered to be the first end of the housing 102. As is shown by arrows 108 and 110, the inlet and outlet are not at opposite ends of the housing 102. On the contrary, the inlet and outlet may be at the same end of the housing 102, as is shown in FIG. 2.

The inlet and outlet may have various spatial relationships with one another that are other than at opposite ends of a housing. For example, the inlet and outlet may both be on a same half of a housing along an imagined axis through the housing. Or, the inlet and outlet may be on a same third of a housing or a same quarter of a housing or a same eighth of an housing along an imagined axis relative to the housing. The housing may be enclosed except for only the inlet and the outlet. The housing may have two ends relative to an imagined axis through the housing, and one end of the two ends may be externally enclosed and have no external fluid inlet or outlet. The imagined axes in this paragraph may be, for example, an axis 112 of elongation of the housing (as in FIG. 2) and/or an axis of working fluid flow within the housing and/or an axis that includes a center region of the volume of the housing and/or another axis, e.g., a like axis. As used herein, a working fluid flow (not shown in FIG. 2) is the fluid flow that interacts with a work substrate (not shown in FIG. 2), for example, fluid flow over a substrate where a material or device is being grown or otherwise fabricated.

Although the fluid inlet and fluid outlet of the housing 102 are located externally not at opposite ends of the housing 102 (and are located externally toward just one end of the housing 102), the working fluid flow within the housing 102, according to an embodiment of the invention, is to extend through a majority of the length of the housing 102 (or a majority of the length of the portion of the housing 102 that is to be exposed to processing by the process station). For example, a fluid conduit (not shown in FIG. 2) can be employed to convey fluid between one of the inlet or outlet (which are toward one side of the housing 102) and a point that is toward another side of the housing 102. The fluid conduit can have a configuration that permits the housing 102 to be loaded into a process station from a single direction (e.g., from the right in FIG. 2), for example, without thereafter needing separate manual connecting of a fluid line to the housing 102 at a portion of the housing 102 in a direction other than the single direction. (For example, in FIG. 2, the housing 102 may be loaded from the right without thereafter needing separately to manually connect a fluid line at, e.g., the left of the housing 102.) The fluid conduit may be integral to the housing 102 (e.g., as will be shown in some of FIGS. 3A-3J) or may be (otherwise) configured to permit the housing 102 to be loaded into a process station from a single side (e.g., as will also be shown in some of FIGS. 3A-3J). The single side may, as illustrated in FIG. 2, be a side that lets the housing 102 to be loaded from a longitudinal direction. In the example of a tube furnace, loading from the longitudinal direction minimizes the leading area (i.e., area in the direction of motion) of the housing during loading and minimizes the required opening size of the furnace, as compared to loading from a direction that is more radial with respect to the longitudinal axis of the channel that is to accept the housing.

FIGS. 3A-3J are schematic views that illustrate several layouts and features, according to embodiments of the present invention, for housings that are embodiments of the housing 102 of FIG. 2 and that include a fluid conduit to facilitate directing a working fluid flow. The housings illustrated by FIGS. 3A-3J may be, for example, quartz tubes that are externally closed (i.e., non-open) on one end. The housings maybe made of quartz, glass, ceramic, plastic, metal, or the like, or any other material, or a combination thereof, depending on the envisioned application and depending on designer preference.

FIGS. 3A, 3C, 3E and 3G are schematic "front" views of example housings 102*a*, 102*c*, 102*e* and 102*g*, respectively. For simplicity, the housings and their features are schematically shown in the schematic front views as if they were transparent, with thicker lines indicating walls (e.g., indicating where the walls are tangent to a direction that is perpendicular to the drawing page), with thinner straight lines indicating wall edges (e.g., around openings), and with thinner S-shaped lines indicating a truncation of a feature in the drawing. (Truncation is generally for compactness and clarity of the drawing). The portions of housings 102*a*, 102*e* and 102*g* that have been truncated away and are not shown in FIGS. 3A, 3E and 3G may take any competent form, as will be further discussed. For example, they may take the form of the corresponding portion of the housing 102*c* shown in FIG. 3C. Calling one view the "front" view, or the like, in any drawing of the present document can be considered to be an arbitrary formalism for convenience in description, and no limitations in the shown embodiment are intended to be implied thereby.

Each of the housings 102*a*, 102*c*, 102*e* and 102*g* includes a respective conduit 118*a*, 118*c*, 118*e* or 118*g*. Each of the conduits includes a respective opening 120*a*, 120*c*, 120*e* or 120*g*, which can be referred to as a nozzle. Each of the nozzles opens within a respective interior 122*a*, 122*c*, 122*e* or 122*g* that is defined by the corresponding housing 102*a*, 102*c*, 102*e* or 102*g*. Each nozzle can emit fluid—e.g., liquid or gas—that has been routed, via the nozzle's corresponding conduit 118*a*, 118*c*, 118*e* or 118*g*, from the fluid inlet of the housing 102*a*, 102*c*, 102*e* or 102*g*. The fluid is emitted into the interior of the housing for exhausting via the outlet of the housing. The inlets and outlets of the housings are respectively indicated by inflow arrows 108*a*, 108*c*, 108*e*, 108*g* and outflow arrows 110*a*, 110*c*, 110*e*, 110*g*. However, the indicated fluid flow can instead be in the reverse direction, in which event the nozzles would accept fluid instead of emitting fluid. Such an alternative fluid flow could be indicated or visualized by reversing the directions of the arrows 108*a*, 108*c*, 108*e* and 108*g* and 110*a*, 110*c*, 110*e* and 110*g* and thereby recognizing the inlets and outlets as indicated in FIGS. 3A, 3C, 3E and 3G as instead being outlets and inlets, respectively. Various mechanisms and methods of connecting housings to inlets and outlets are known in the art. Any such competent mechanism or method may be used.

The example housings 102*a*, 102*c*, 102*e* and 102*g* illustrate various examples of features and layouts. For example, the housing 102*g* of FIG. 3G includes a conduit 118*g* that includes a work platform 126 (shown schematically in profile view by a solid very thick line) upon which a work piece (not shown) may be processed. The work piece, or the platform 126 itself, may for example be a substrate upon which materials or devices are grown. When the housing 102*a*, 102*c*, 102*e* or 102*g* is being affected by a process station, the work piece is also affected by the process station (e.g., via the housing). The conduit 118*g* is an example of a combination of a work-piece loader and fluid conduit. Work-piece loaders are known in the art. The conduit 118*g* differs from conventional work-piece loaders by having a coupling to a feedstock fluid inlet. Fluid couplings are known in the art. The conduit 118*g* may be separate from the outer walls of the housing 102*g* when the conduit 118*g*'s work platform 126 is being loaded with a work piece, and then the conduit 118*g* may be loaded into position relative the outer walls of the housing 102*g*. Loading the conduit 118*g* into position can be by any competent mechanism or method. The housings 102*a*, 102*c* and 102*e* can be used with any competent work-piece loader, for example, a conventional work-piece loader, or the like.

FIGS. 3B, 3D, 3F and 3H may be considered to be schematic section views of the housings shown in FIGS. 3A, 3C, 3E and 3G, respectively. In FIGS. 3B, 3D, 3F and 3H, and in FIGS. 3I and 3J, all thick single lines are used, for simplicity and clarity, to indicate sectioned surfaces. For more formality, the single thick lines can be replaced (e.g., mentally) with parallel double lines that are shaded in between by hatch lines. For clarity, no features, other than sectioned surfaces, are shown in FIGS. 3B, 3D, 3F and 3H, nor in FIGS. 3I and 3J.

Figure 3B:
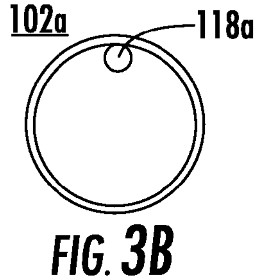
FIGS. 3A-3J are schematic views of example housings and variations, according to some embodiments of the present invention.
Figure 3A:
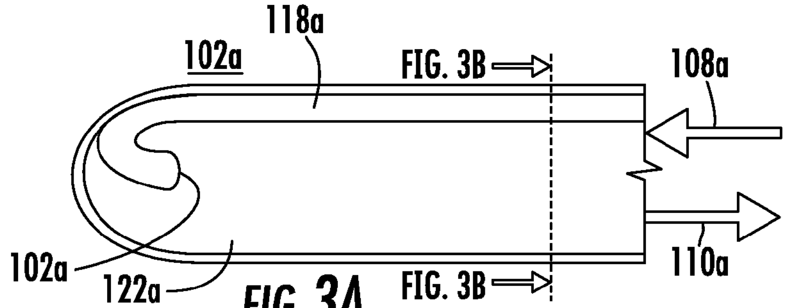
Figure 3D:
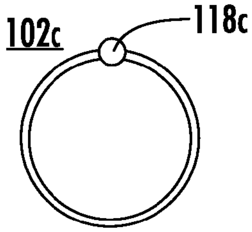

The housing 102*a* of FIG. 3A schematically illustrates a conduit 118*a* that is positioned against an interior surface of a wall of the housing 102*a*, as is further illustrated, for example, by FIG. 3B. The conduit 118*a* is an example of a conduit with an internal (-to-the-housing-interior) configuration.

Figure 3C:
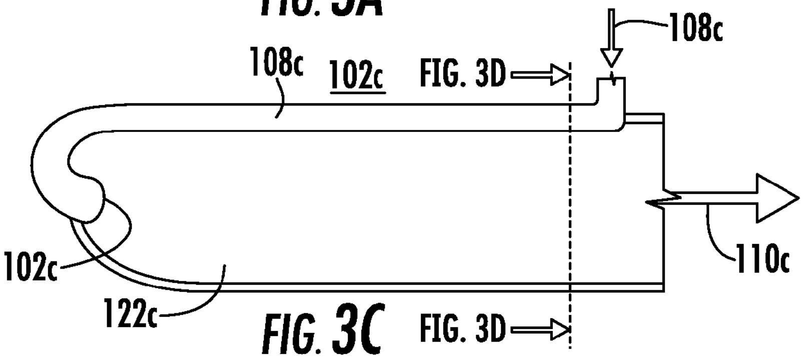
Figure 3F:
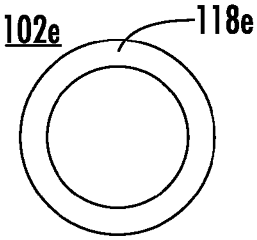
Figure 3E:
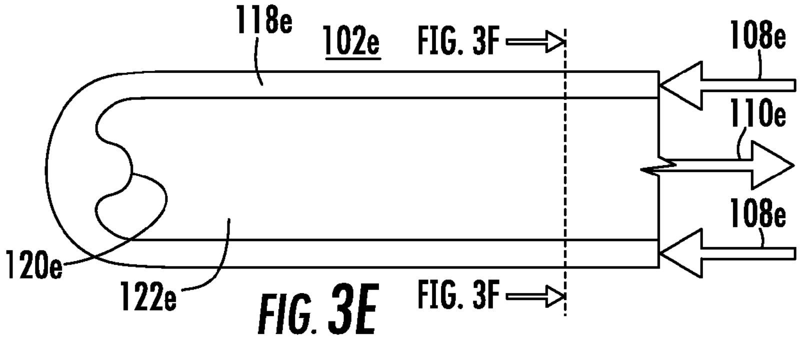
Figure 3H:
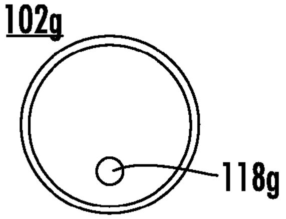

The housing 102*c* of FIG. 3C schematically illustrates a conduit 118*c* that is inset into the wall of the housing 102*c*, as is further illustrated, for example, by FIG. 3E. The conduit 118*c* is an example of a conduit with an inset (-into-an-exterior-wall-of-the-housing-102*c*) configuration. The conduit 118*c* also is an example of a conduit having a gas inlet, shown by arrow 108*c*, (or a gas outlet, if the arrow 108*c* is reversed) that is not necessarily completely at one end of the housing 102*c* and yet is toward the same end, of the housing, that contains the gas outlet, shown by the arrow 110*c* (or inlet, if the arrow 110*c* is reversed). As with the other drawings, FIG. 3C is not to scale. Accordingly, the inlet and outlet ends (nearest the arrows 108*c* and 110*c* respectively) may be longer than as illustrated, in order to provide more area for clamping by fluid-line hose-end clamps. Further, the inlet and outlet ends may include bends or curvatures that are not shown. For example, the inlet end (nearest the arrow 108*c*) may be configured with a bend so that the inlet and outlet ends are parallel to one another (e.g., in FIG. 3C, the inlet end may bend to the right.)

Figure 3G:
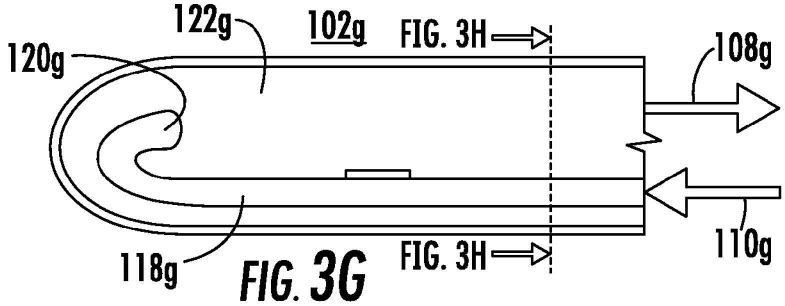

The housing 102*e* of FIG. 3E schematically illustrates a conduit 118*e* that is a gap between double walls, e.g., an external wall 128 and an internal wall 130, as is further illustrated, for example, by FIG. 3F. The housing 102*g* of FIG. 3G schematically illustrates a conduit 118*g* that does not touch interior surfaces of a wall of the housing 102*g*, at least along a longitudinal segment of the housing 102*g*, as is further illustrated, for example, by FIG. 3H. The conduit 118*g* is an example of-a conduit with an internal (-to-the-housing-interior) configuration, and also a free internal configuration that does not touch the internal surface of the external wall of the housing 102*g*.

Generally, the inlet and outlet of any housing 102*a*, 102*c*, 102*e* or 102*g* can take any competent form. In some embodiments of the housings 102*a*, 102*c*, 102*e* or 102*g*, the housing terminates on or near one end into two conduit ends—e.g., two tubes (as shown in FIG. 3C), e.g., two quartz tubes, or the like or any other form. If the two conduit ends have a standard shape and/or size (e.g., standard quartz tubes), then standard conduit couplers and connectors can be used on them. Or, if the two conduit ends have non-standard shapes, then custom-shaped couplers can be made and supplied, as appropriate. Making a housing that includes inlets and outlets, given the teachings of the present document, is within the ordinary skill in the art. For example, in the example of quartz tubes or glass tubes, various techniques are known for working with quartz tubes or glass tubes, including techniques of "quartz welding" such tubes and surfaces together, and the like.

Figure 3I:
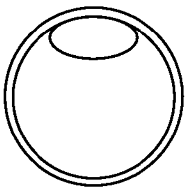
Figure 3J:
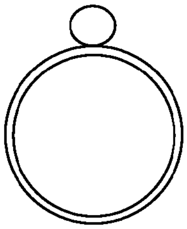

FIGS. 3J and 3I may be considered to be schematic section views of other particular configurations for conduits, namely an external (to-the-housing-interior) configuration and an oval configuration. In general, choices regarding configurations for the conduits and nozzles and inlets and outlets and direction of fluid flow may be made separately and combined in any competent way. In short, the choices are not to be limited to merely those combinations shown in the example drawings. Other layouts and designs and implementations and choices can also be chosen to embody the housing 102 of FIG. 2 in various ways. For example, although the example housings and conduits are shown as being circular or oval in cross section, still other shapes may be used, for example polygonal shapes, or irregular shapes, or the like, or any other competent shape for providing fluid flow or for containing the interior. As has been shown in some of the examples, the housings can have a cross section having a regular external shape (e.g., circular, polygonal, oval, or the like), with the addition of the conduit not thereby making the cross-sectional external shape irregular.

A work module, for example, an embodiment discussed in the present document, may be loaded into a process station purely by hand, if appropriately configured. Alternatively, loading apparatuses may be used to facilitate loading a work module into a process station. For example, a loading apparatus may include a movable mount to which the work module is mounted. The movable mount preferably is configured to move, during operation, along a restricted range of motion that moves the work module into a position to undergo processing by the process station and/or out of such a position for removal. For example, the movable mount may be configured to move with a mounted work module that has already been connected to fluid (e.g., gas) inflow and outflow lines, e.g., such that once the work module is loaded into the process station, no further connecting of lines to the work module is necessary.

Figure 4:
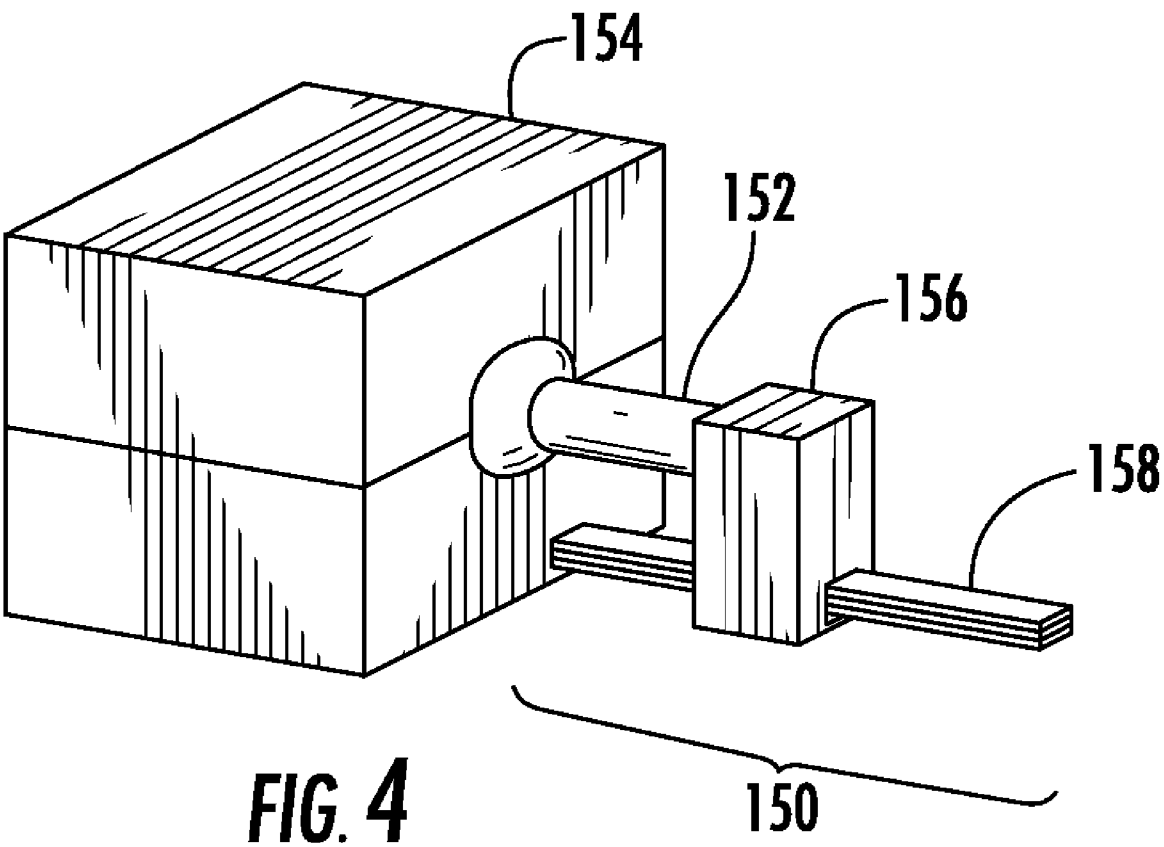
FIG. 4 is a schematic perspective view that illustrates one embodiment of a loading or unloading apparatus, according to an embodiment of the present invention.

FIG. 4 is a schematic perspective view that illustrates one embodiment of a loading apparatus 150, according to an embodiment of the present invention. The loading apparatus can facilitate loading a work module 152 into a process station 154. The loading apparatus 150 includes a mount 156 to which the work module 152 is mounted. The mount 156 is coupled to a guide 158 that is positioned and configured to guide the work module 152 into a position to undergo processing by the process station and/or out of such a position for removal. As shown, the guide 158 is or includes a rail that defines the path of movement, and the mount 156 is or includes a rail car that slideably couples to the guide 158. However, any other competent type of motion guidance mechanism may be chosen, foe example, swing arms, multi-bar linkages, suspended designs, members driven by stepper motor, or the like, or any other competent guidance mechanism.

The rail car preferably has a fixing mechanism, e.g., a clamp or (other) brake, that will prevent movement once a desired position has been attained. Various types of fixing mechanisms are known; any competent such mechanism may be used.

Figure 5:
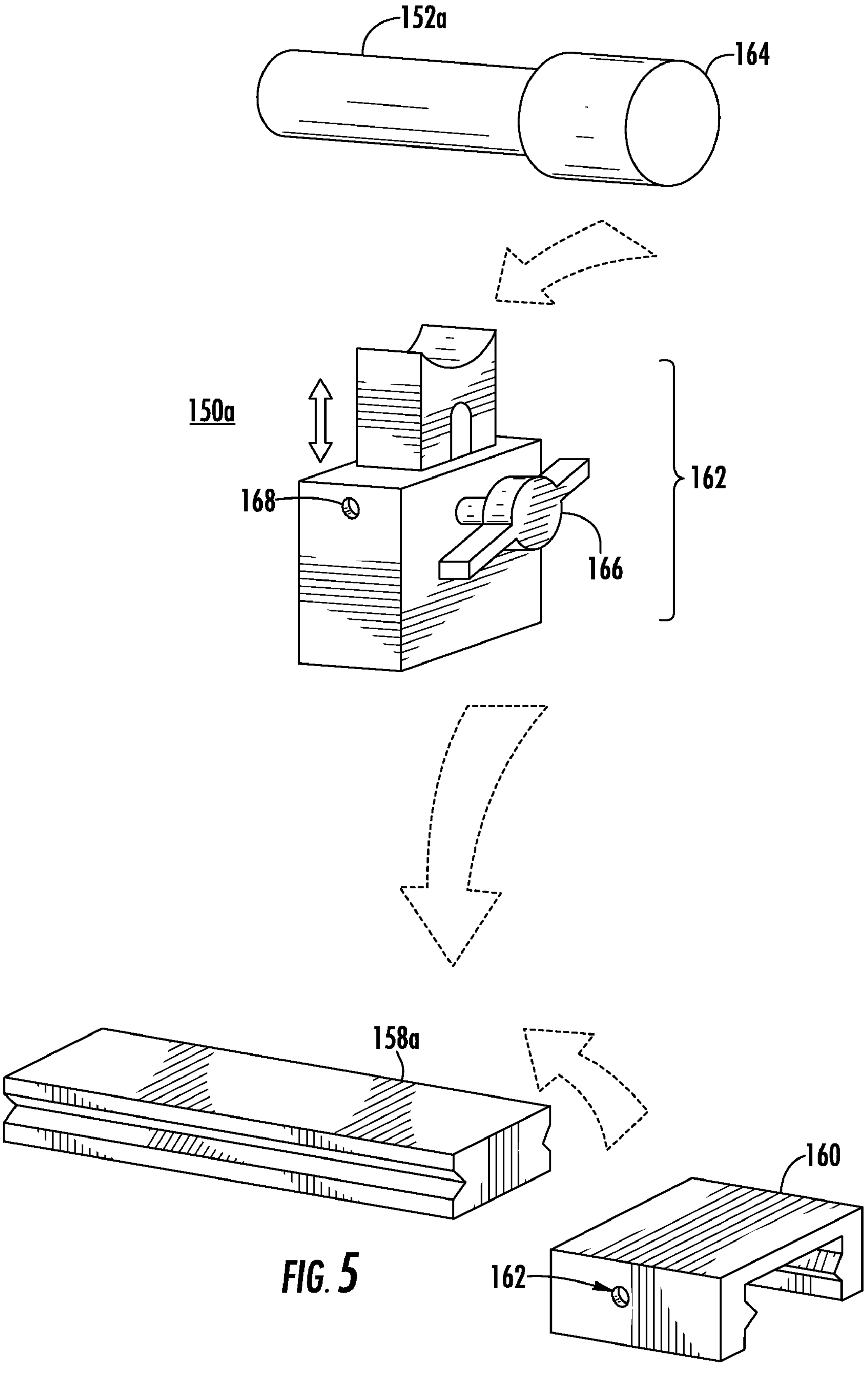
FIG. 5 is a schematic perspective exploded view that illustrates a loading or unloading apparatus that is one embodiment of the loading apparatus of FIG. 4.

FIG. 5 is a schematic perspective exploded view that illustrates a loading apparatus 150*a* that is one embodiment of the loading apparatus 150 of FIG. 4. The loading apparatus 150*a* includes a rail 158*a* and a mount that includes a rail car 160, a height-adjustable member 162, and a work-module holder 164 that is configured to hold a work module 152*a*. The holder 164 is coupled to the height-adjustable member 162, and the height-adjustable member 162 is coupled to the rail car using any type of competent coupler or connector. The coupling between the elements may be by detachable connections or by permanent connections. For example, integral connections may be used that arise from integrally forming the rail car 160 and (part of) the member 162 and integrally forming the holder 164 and (part of) the member 162. Any competent material or combination of materials may be used to form the loading apparatus 150 and its parts. For example, metal may be used for its strength and durability. Alternatively, other materials may be used.

Rails used in a loading apparatus may be linear or non-linear rail, as desired, and may have any desired and competent cross section shape, and so forth. As shown, the rail car 160 may include a clamping screw 162 or the like to prevent movement of the rail car on the rail once a desired position has been attained. The height-adjustable member 162 may, as shown, comprise two members slideably connected to one another, with overall height being adjusted by a conventional screw-lift mechanism 166. The screw-lift mechanism 166 is shown as being controlled and/or powered by a hand-operated twist switch. However, any other control or powering mechanism may be used. For example, a motorized lift mechanism may be used, which may be manually controlled or computer-controlled. As shown, the height-adjustable member 162 may include a clamping screw 168 or the like to prevent further height-adjustment once a desired height has been attained.

Any competent type of holder that is capable of holding a desired work module may be used. For example, clamps of any competent type may be used. For example, for a quartz tube or similar type of work module (e.g., housings discussed in connection with FIGS. 2 and 3A-3J), any competent (tube) clamp may be used. For example, clamps such as mentioned in U.S. patent application Ser. No. 10/654,599, "Apparatus and method for actuating or maintaining a seal by differential pressure", filed Sep. 2, 2003, may be used, with appropriate modifications or duplications for handling both the inlet and outlet of a work module. For example, for a quartz-tube work module that branches into two tubes toward one end (see, e.g., FIG. 3C), whether the two tubes are parallel or not parallel, a holder can comprise two tube clamps, e.g., two vacuum-sealed clams, connected together by a member, the member including a connector to the rail car. Connection of clamps, members, holders, length-adjustable members, rail cars, and the like can be by connectors and couplers that are known in the art.

Although FIGS. 4 and 5, in order to provide an example, depict specific features and arrangements, it is to be understood that other features and arrangements and implementations may be chosen. To mention just one example, although FIGS. 4 and 5 depict a horizontal track and a height-adjustable member 162, any other orientation of the loader apparatuses 150 or 150*a* may be used, as appropriate. For example, a vertical track orientation or another orientation may be chosen. The height-adjustable member 162 of FIG. 5 is an example of a positionally-adjustable member. A positionally-adjustable member may, as appropriate, be referred to as an example of an alignment-adjustment member to indicate that the member is to be used to help align the work module, e.g., with the process station, e.g., with an opening or other feature of the process station. Many types of position-adjustable mechanisms are known. Any desired competent such mechanism may be used to implement a positionally-adjustable member.

A work module—for example, an embodiment discussed in the present document—may undergo treatment before or after being positioned in the process station. For example, a work module may be cooled by fans during such treatment, or treated in like ways or any other way. The treatment may be by an apparatus that is configured or located in conjunction with a loading apparatus. The treatment apparatus may be physically part of a same apparatus as the loading apparatus.

Figure 6A:
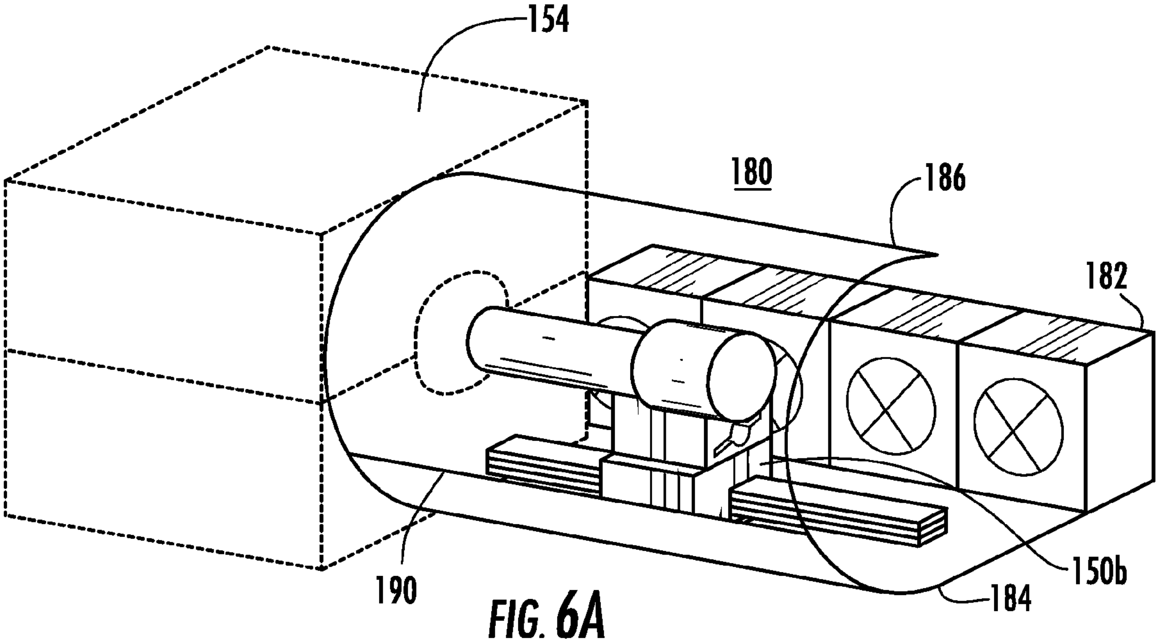
FIG. 6A is a schematic perspective view of an apparatus that is an example of a loading or unloading apparatus and a work module pre-treatment or post-treatment apparatus according to an embodiment of the present invention.
Figure 6B:
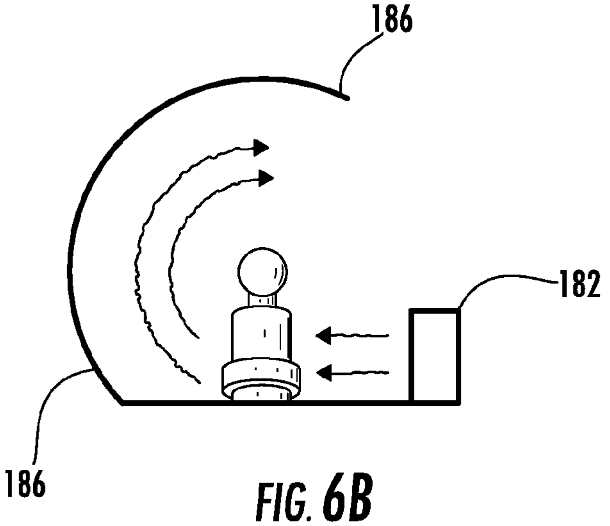
FIG. 6B is a schematic side view of the apparatus of FIG. 6A.

FIG. 6A is a schematic perspective view of an apparatus 180 that is an example of a loading apparatus and a work module pre-treatment or post-treatment apparatus according to an embodiment of the present invention. The apparatus 180 includes a loading subassembly 150*b* and a bank of one or more fans 182 positioned to create air flow. The air flow impacts a work module 150*b*. For example, the fans 182 may, e.g., blow air onto the work module 150*b* to, e.g., cool the work module 150*b*, e.g., after the work module 150*b* has been removed, hot, from a furnace. The fans 182 may be physically coupled to the loading subassembly 150*b*, and the entire apparatus 180 may be moved and carried as a unit without loose parts falling off. For example, the fans 182 and the subassembly 150*b* may both be fixedly mounted onto a base 184. Optionally, the apparatus 180 may include a shield 186. The shield 186 may be a safety shield to discourage contact by a user with the work module 150*b*, which may be dangerously hot at times. Optionally, the shield 186 may be configured to help guide airflow from the fans 182, e.g., in order to direct the airflow away from a direction, e.g., the front, where a human operator can stand. The shield 186 may be hinged, e.g., along the line 190, to permit the shield to be lowered or otherwise unpositioned, to facilitate accessibility to the work module or the loading subassembly 150*b*. FIG. 6A is a schematic side view of the apparatus 180. In FIG. 6B, possible cooling airflow is schematically indicated by wavy arrows.

Generally, the features of the present invention that appear as if they may be manually operated and/or powered may be alternatively configured to be powered by any non-manual power source. For example, the adjusting of an alignment-adjustment member, the engaging or disengaging of position-fixing locks, the moving of the work module mount into or out of a process station, or the like, may be powered, for example, electrically, pneumatically, hydraulically, or the like, or using any other power mechanism and may be controlled manually or by computers. Various methods of powering mechanical devices using non-manual means are well known and could be used, in view of the teachings of the present document.

Figure 7:
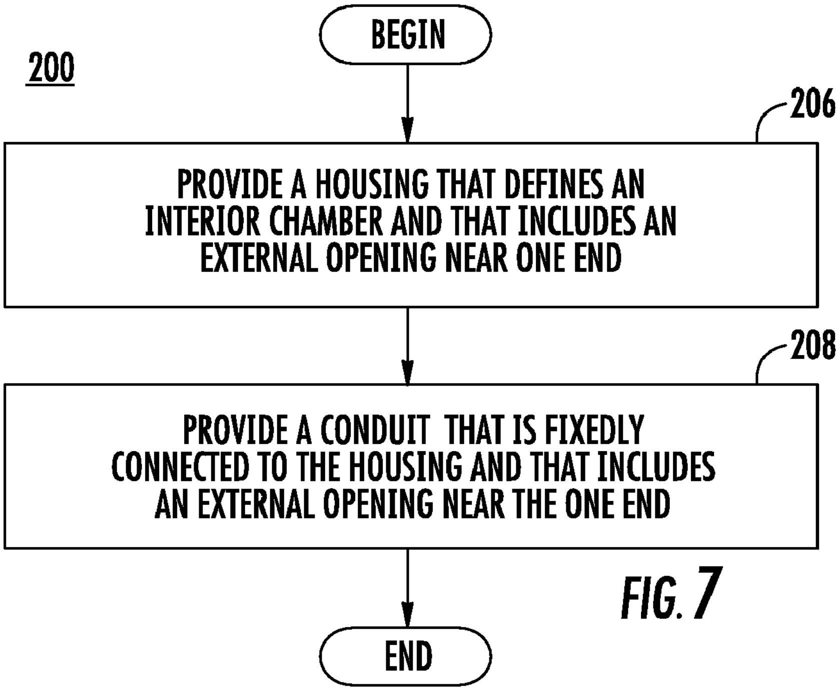
FIG. 7 is a schematic flowchart indicating a method for producing an apparatus for containing a work piece and for directing fluid flow over the work piece during processing, according to an embodiment of the present invention.

FIG. 7 is a schematic flowchart indicating a method 200 for producing an apparatus for containing a work piece and for directing fluid flow over the work piece during processing, according to an embodiment of the present invention. In one embodiment, the apparatus produced may be a housing, for example, a housing as discussed in connection with FIGS. 3A-3J.

In the method 200, there is a step 206 of providing a housing that defines an interior chamber and a step 208 of providing a conduit fixedly connected to the housing. One end of the housing can be referred to as the first end, and an opposite end of the housing can be referred to as the second end. The housing includes an opening that is nearer the first end than the second end. The conduit includes an external opening nearer the first end than the second end. The conduit includes a second opening that opens into the interior chamber and a third opening that opens not into the interior chamber. The third opening is nearer to the first end than to the second end. The fluid flow is from one of the first opening and the second opening to another of the first opening and the second opening. One of the third and first openings is to accept input fluid and another of the third and first openings is to produce fluid output. The fluid flow may be gas flow or liquid flow. The housing may include a tube that is capable of being heated in a tube furnace, for example, a quartz tube or other type of tube.

In one embodiment, the step 208 of providing a conduit may include providing a member and connecting the member to the housing. For example, the member may already be in conduit form, e.g., a tube, and connected to the housing. For another example, the member may be only an incomplete conduit (e.g., a tube that has a missing wall along its length) that is made complete by connecting and sealing it against an internal wall of the housing. For example, the connecting or sealing can be by quartz welding or any other competent process. Various such processes are known.

In another embodiment, the housing and the conduit are provided from a single tube that is bent into a “U” shape. The two “arms” of the U shape may be separated from each other by a gap, as in the letter “U”. Alternatively, the two “arms” of the U shape may touch, but the interiors of the two arms may still be said to form a “U”. One arm of the U shape is capable of containing a work piece, and that arm, for example, might be considered to be the housing, and the other arm might be considered to be the conduit. One arm of the U shape, e.g., the conduit arm, may be made to be thinner than the other arm. Methods of bending and thinning tubes are known. Given the teaching of the present document, it is within the skill of those in the art to form the desired housing and conduit.

Figure 8:
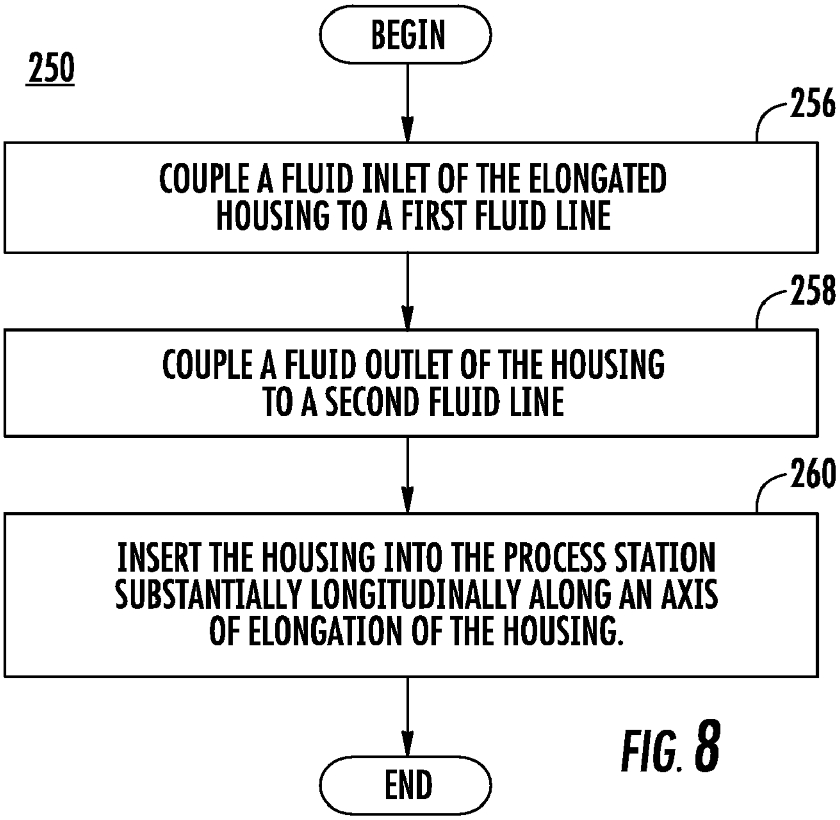
FIG. 8 is a schematic flowchart indicating a method 250 for facilitating movement of an elongated housing containing a work piece into position to be affected by a process station.

FIG. 8 is a schematic flowchart indicating a method 250 for facilitating movement of an elongated housing containing a work piece into position to be affected by a process station. In the method 250, there is a step 256 of coupling a fluid inlet of the housing to a first fluid line, a step 258 of coupling a fluid outlet of the housing to a second fluid line, and a step 260 of inserting the housing into the process station substantially along an axis of elongation of the elongated housing. In general, the steps 256, 258 and 260 may be performed in any order whatsoever. However, in a particular embodiment, the inserting step 260 is performed after the coupling steps 256 and 258.

For example, the process station may include a furnace that defines an elongated heat chamber, with the elongated chamber having two ends and an elongated main portion in between the two ends. For example, the furnace may be a laboratory furnace, for example, a bench-top laboratory furnace, or any other type of furnace. For example, the method may further include a step of preheating the furnace and/or refraining from opening the main portion of the elongated heat chamber prior to the inserting step. For example, the preheating step may include preheating the furnace to within 5 or within 10 or within 20 percent of a desired operating temperature for processing a work piece within the housing. For example, the method may further include a step of loading a work piece into the housing. For example, the loading step may be performed prior to the coupling steps 256 and 258. The inserting step may utilize a work-module (e.g., housing) loading apparatus, such as any discussed in the present document. The work-piece loading step may include loading a combined work-piece loader/conduit, as was discussed in connection with FIG. 3G; or, the work-piece loading step may include loading a work-piece according to any competent manner. For example, the work-piece loading step may include loading the work-piece via a conventional loader/platform into the housing while the housing is itself supported by a work-module loading apparatus.

Other embodiments of the present invention are apparatuses produced according to any method embodiment of the present invention.

Throughout the description and drawings, example embodiments are given with reference to specific configurations. It will be appreciated by those of ordinary skill in the art that the present invention can be embodied in other specific forms. The scope of the present invention, for the purpose of the present patent document, is not limited merely to the specific example embodiments of the foregoing description, but rather is indicated by the appended claims. All changes that come within the meaning and range of equivalents within the claims are to be considered as being embraced within the spirit and scope of the claims.

What is claimed is:

1. A method comprising:

providing a housing that defines an interior chamber, the housing having a first end and a second end, the second end being an opposite end to the first end, and the housing having a first opening nearer the first end than the second end; and providing a conduit coupled to the housing, the conduit having a second opening that opens into the interior chamber and a third opening, wherein the third opening is nearer to the first end than to the second end and at least a portion of the conduit extends along a wall of the housing and comprises a surface outside the housing, wherein a fluid flow is from at least one of the first to the second opening or the second to the first opening, and when the third opening accepts input fluid, the first opening produces output fluid, and when the first opening accepts input fluid, the third opening produces output fluid.

2. The method of claim 1 wherein the fluid flow comprises a gas flow.

3. The method of claim 1 comprising:

inserting the housing into a tube furnace and making connections only to the first and third openings.

4. The method of claim 1 wherein the second opening is an opening of the housing.

5. The method of claim 1 wherein input fluid enters the interior chamber only through at least one of the first or third opening.

6. A method comprising:

providing a housing that defines an interior chamber, the housing having a first end and a second end, the second end being an opposite end to the first end, and the housing having a first opening nearer the first end than the second end; and providing a conduit coupled to the housing, the conduit having a second opening that opens into the interior chamber and a third opening, wherein the third opening is nearer to the first end than to the second end, and a cross section of at least a portion of the conduit comprises a first wall outside the interior chamber and a second wall forming a surface of the interior chamber, and the second wall and the housing meet at two points of the cross section, wherein a fluid flow is from at least one of the first to the second opening or the second to the first opening, and when the third opening accepts input fluid, the first opening produces output fluid, and when the first opening accepts input fluid, the third opening produces output fluid.

7. The method of claim 6 wherein the fluid flow comprises a gas flow.

8. The method of claim 6 comprising:

inserting the housing into a tube furnace and making connections only to the first and third openings.

9. The method of claim 6 wherein the second opening is an opening of the housing.

10. The method of claim 6 wherein input fluid enters the interior chamber only through at least one of the first or third opening.

11. A method comprising:

providing a housing that defines an interior chamber, the housing having a first end and a second end, the second end being an opposite end to the first end, and the housing having a first opening nearer the first end than the second end; and providing a conduit coupled to the housing, the conduit having a second opening that opens into the interior chamber and a third opening, wherein the third opening is nearer to the first end than to the second end, wherein a fluid flow is from at least one of the first to the second opening or the second to the first opening, and when the third opening accepts input fluid, the first opening produces output fluid, and when the first opening accepts input fluid, the third opening produces output fluid, and the second opening is coupled to the second end of the housing.

12. The method of claim 11 wherein the fluid flow comprises a gas flow.

13. The method of claim 11 comprising:

inserting the housing into a tube furnace and making connections only to the first and third openings.

14. The method of claim 11 wherein input fluid enters the interior chamber only through at least one of the first or third opening.

* * * * *